Patented Mar. 27, 1928.

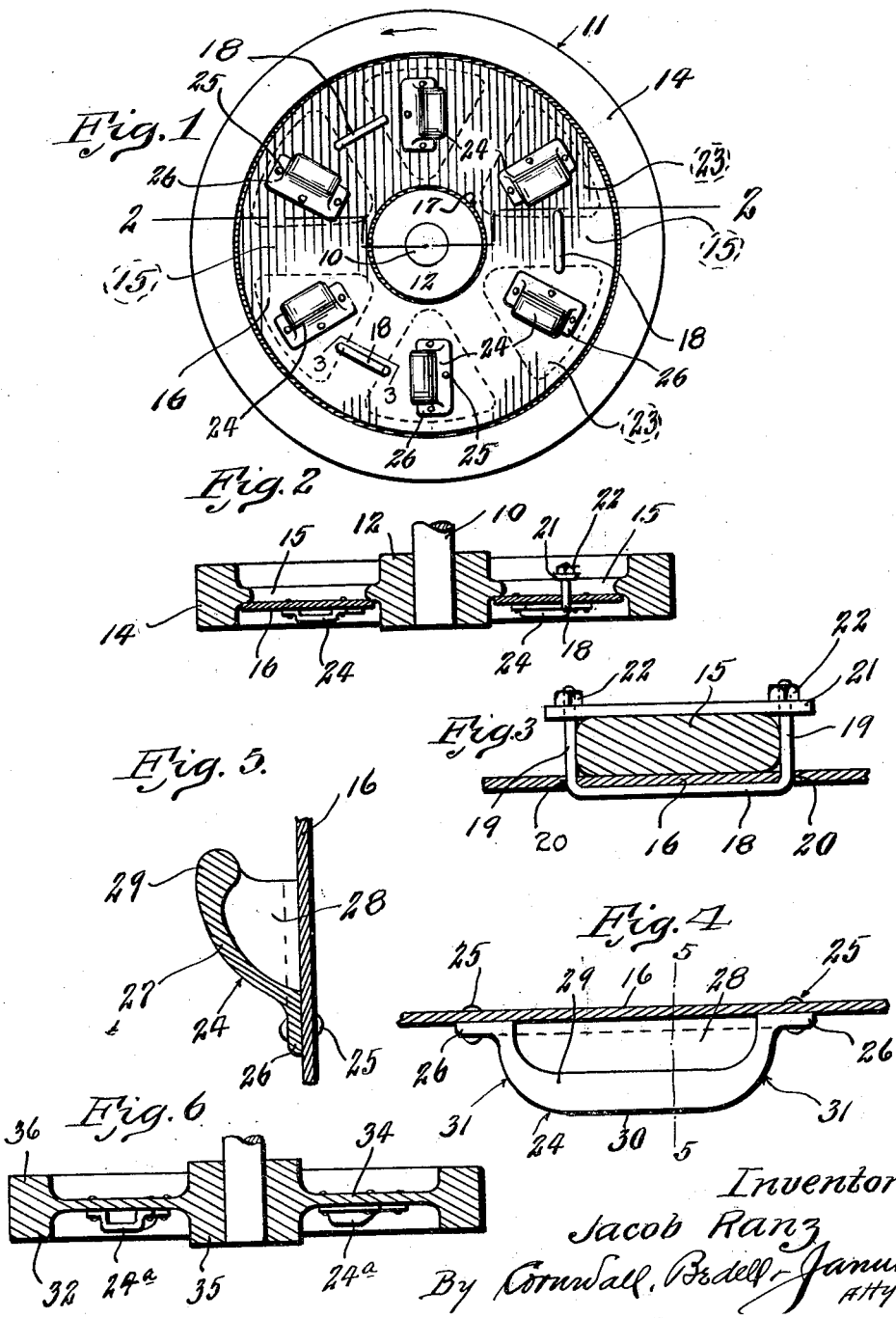

1,663,814

UNITED STATES PATENT OFFICE.

JACOB RANZ, OF ST. LOUIS, MISSOURI.

FLYWHEEL.

Application filed September 10, 1926. Serial No. 134,643.

This invention relates to new and useful improvements in fly wheels.

Fly wheels are generally constructed with spokes radiating from the hub portion of the wheel to the rim portion thereof. In order to protect the workman from getting his hands or clothing caught between the spokes of the fly wheel, it is customary to either enclose the fly wheel in a cage or cover the spokes with a cover plate placed against one side of the wheel. In some instances fly wheels are formed with an integral solid web portion instead of spokes.

In the operation of presses and other machinery, it is very frequently necessary to operate the machine by hand. This is usually done by the workman grasping the spoke of the fly wheel with one hand and rotating said wheel. Where the fly wheel is enclosed in a cage it is necessary to open this cage to provide access to the wheel thereby wasting a great deal of time. For this reason it is more desirable to use a fly wheel which is exposed and in which the spokes are covered by a plate placed thereagainst. However, by using this plate or forming the fly wheel with an integral solid web portion, the workman is greatly handicapped in manually operating the machine as no means are provided to enable him to get a good hold on the wheel.

It is the object of the present invention to provide means carried by the cover plate of the web portion of the fly wheel, said means being provided on the far side with respect to the direction of rotation of the fly wheel with a suitable recess so as to enable the workman to obtain a suitable hand hold on the wheel when it is desired to manually operate the latter. This means or handle has its remaining sides formed sloping or curved so as to prevent abrupt projecting faces being presented in the line of rotation of the wheel.

Other objects of the invention are to provide a member attachable to the fly wheel or a cover plate for the spokes thereof, said member being provided with a recess to form a suitable handle disposed in a predetermined relation with respect to the direction of rotation of said fly wheel. The remaining surfaces of said member are curved so as to merge with the flanged portion thereof.

Further objects of the invention are to provide a fly wheel having a closed web portion extending between the hub and rim portion of said fly wheel and provided with a series of radial handles arranged on said web portion equi-distant about the axis of said fly wheel and having gradually curved surfaces presented in the line of rotation of said fly wheel thereby eliminating abrupt lateral projections on said fly wheel.

With these and other objects in view, my invention consists of certain novel features of construction and arrangement of parts, hereinafter more fully described and claimed, and illustrated in the accompanying drawings, in which—

Figure 1 is an elevational view of a fly wheel constructed in accordance with my invention.

Figure 2 is a horizontal cross section taken on line 2—2 of Figure 1.

Figure 3 is a detailed cross section taken on line 3—3 of Figure 1.

Figure 4 is a rear elevational view of one of the handles.

Figure 5 is a vertical cross section taken on line 5—5 of Figure 4.

Figure 6 is a horizontal cross section through a modified form of the fly wheel.

Referring by numerals to the accompanying drawings, 10 indicates a shaft on which is mounted a fly-wheel 11, the latter consisting of a hub portion 12, rim portion 14 and spokes 15 all of which may be of the usual construction.

A cover plate 16 is placed against one side of spokes 15 and is provided with a central opening 17 for accommodating hub portion 12. This plate is of suitable size to extend within rim 14. Plate 16 is secured in position by means of U-bolts 18 which have their terminal portions 19 extending through openings 20 in plate 16 transversely of and on each side of each spoke 15. A transverse member 21 is apertured near its ends for the reception of the threaded ends of portions 19 and clamps cover 16 against the spoke 15. Each member 21 is secured in position by means of fastening devices or nuts 22 screwed on the ends of portions 19. The ends of portions 19 terminate substantially flush with said nuts so as to eliminate abrupt projections on the fly wheel. However, plate 16 being placed against the outside of spokes 15, nuts 22 and members 21 are disposed on the inner side of the fly wheel adjacent to the press or other machine with which said fly wheel is associated and consequently there is no danger of injury to the workman from the above. Plate 16 closes spaces 23 formed by spokes 15 so that all danger of the workman's hand or clothing being caught between said spokes is thereby eliminated.

To permit ready manipulation of the fly wheel by the workman, I provide a series of hand-hold members 24 which are fixed to plate 16 by suitable fastening means 25 and are spaced on said cover equi-distant about the axis of fly wheel 11. Each member 24 is provided at its base with a marginal flange 26 by means of which said member is secured to plate 16 and the body portion of said member 24 consists of a wall 27 which curves upwardly and rearwardly so as to form a recess 28 for accommodating the fingers of the operator's hand and the rearwardly presented edge of said wall is shaped so as to form a suitable handle portion as indicated at 29. Each member 24 is disposed on cover 16 so as to dispose handle portion 29 radially on said wheel and present it rearwardly with respect to the direction of rotation thereof. The outer faces 30 and 31 of wall 27 are curved and merge with flange 26 thereby eliminating sharp corners and projections and presenting smooth surfaces in the line of rotation of said wheel.

In this manner suitable means are provided to enable the workman to manually operate the fly wheel without any difficulty and at the same time all abrupt surfaces or projections are eliminated so that there is no danger of the workman's hand or clothing being caught thereby when the wheel is rotated.

In the form shown in Figure 6, the fly wheel 32 is formed with a solid web portion 34 which extends between hub portion 35 and rim portion 36. A series of hand-hold members 24ª is fixed to web portion 34 at suitable spaced intervals and furnishes the means for manually operating said fly wheel.

In this manner I provide simple and inexpensive means for covering the spaces between the spokes thereby providing a safety guard so that the workman cannot get his hand caught therebetween and at the same time suitable means are provided on said cover to allow easy manipulation of the wheel.

While I have shown and described the preferred form of my invention, it is obvious that various minor changes or arrangements could be made in the cover and in the hand-hold members without departing from the spirit of my invention.

I claim:

1. A fly wheel, a plate extending between the hub portion and the rim of said fly wheel, and a series of hand-hold members fixed to said plate and spaced equi-distant about the axis of said wheel, each of said hand-hold members being formed with a shoulder portion presented rearwardly with respect to the direction of rotation of said fly wheel and having its forward and end faces inclined downwardly and forwardly and terminating in marginal flanges adapted to be secured to said plate.

2. In a fly wheel construction, the combination with a plate adapted to be secured to and cover the spokes of a fly wheel, of a hand-hold member having a handle portion presented rearwardly with respect to the direction of rotation of said wheel and spaced laterally relative to said plate and having its forward and end faces inclined downwardly and forwardly relative to the direction of rotation of said wheel, and members for securing said hand-hold member to said plate.

3. The combination of a fly wheel having a portion extending between the hub portion and the rim portion thereof, and a series of hand-hold members having handle portions presented rearwardly with respect to the direction of rotation of said wheel and spaced laterally from said portion, each of said hand-hold members being provided with marginal flanges disposed forwardly and on the sides of each member, the front wall and the end walls of each member being inclined downwardly from said handle portion to merge with said flanged portion thereby presenting smooth surfaces in the direction of rotation of said wheel.

4. In a fly wheel construction, a plate adapted to be placed against one side of a fly wheel so as to cover the spokes thereof, said plate being provided with an opening to accommodate the hub portion of a fly wheel, means for detachably securing said plate to said spokes, and a series of hand-hold members secured to said plate equi-distant about the axis thereof, each of said members being provided with downwardly sloping front and end walls so as to present smooth surfaces in the direction of rotation of said wheel, there being a handle portion formed on each member presented rearwardly with respect to the direction of rotation of the wheel and spaced laterally from said plate.

5. In combination with a fly wheel having a plate disposed between the hub portion and the rim portion thereof, of a series of handles secured to said plate radially and equi-distant from the axis of said wheel, each of said handles having a flanged base, and front and end faces curved laterally from said base and having a recessed rear side so as to provide a suitable handle portion disposed rearwardly with respect to the direction of rotation of said wheel.

In testimony whereof I hereunto affix my signature this 4th day of September, 1926.

JACOB RANZ.